United States Patent
Schmidt

[15] 3,661,511
[45] May 9, 1972

[54] PROCESS FOR THE PREPARATION OF PURE ALUMINUM FLUORIDE

[72] Inventor: Alfred Schmidt, Linz/Donau, Austria

[73] Assignee: Osterreichische Stickstoffwerke Aktiengesellschaft, Linz/Donau, Austria

[22] Filed: Feb. 11, 1970

[21] Appl. No.: 10,625

[30] Foreign Application Priority Data

Feb. 25, 1969 Austria ..............................A 1864/69

[52] U.S. Cl. ....................................................23/88, 23/301
[51] Int. Cl. .............................................................C01f 7/50
[58] Field of Search ..............................................23/88, 301

[56] References Cited

UNITED STATES PATENTS

| | | | |
|---|---|---|---|
| 513,971 | 2/1894 | Ackermann | 23/88 |
| 1,797,994 | 3/1931 | Morrow | 23/301 |
| 3,175,882 | 3/1965 | Derr | 23/88 |

FOREIGN PATENTS OR APPLICATIONS

| | | | |
|---|---|---|---|
| 203,708 | 8/1924 | Great Britain | 23/88 |
| 1,510,806 | 1/1968 | France | 23/88 |

OTHER PUBLICATIONS

" The Condensed Chemical Dictionary," Sixth Ed., 1956, by Rose and Turner, page 584. Reinhold Publishing Corporation, New York.

*Primary Examiner*—Edward Stern
*Attorney*—Wenderoth, Lind & Ponack

[57] ABSTRACT

Preparation of crystalline aluminum fluoride trihydrate low in iron from aqueous soluble iron compounds containing aluminum fluoride solutions by reduction of the ferric ions with nitrogen or sulphur containing reducing agents.

2 Claims, No Drawings

PROCESS FOR THE PREPARATION OF PURE ALUMINUM FLUORIDE

This invention relates to a process for the preparation of pure aluminum fluoride.

It is known to manufacture aluminum fluoride, for example according to British Patent specification No. 782,423, by reacting aluminum hydroxide with hydrofluoric acid or fluosilicic acid, separating the silica, which may precipitate, from the saturated aluminum fluoride solution formed, crystallizing out the aluminum fluoride trihydrate formed, and optionally dehydrating the latter.

Because of its high degree of purity the aluminum fluoride thus obtained may also be employed for the production of aluminum metal but it is relatively expensive because of the requisite purification of the starting materials which, for example, in the case of the aluminum hydroxide can be manufactured in a known manner by dissolving bauxite in a strong caustic alkali at elevated temperature and under pressure and subsequently crystallizing out the aluminum hydroxide from the aluminate solution formed.

Clay of low iron content or bauxite of low iron content themselves can, after their activation by heating to a temperature from 400° to 900° C. admittedly be employed directly for the manufacture of aluminum fluoride by reaction with the acids mentioned, but the impurities which are present, especially their iron content, interfere if the aluminum fluoride thus obtained is to be employed for the manufacture of aluminum.

It has now been found that the iron content in aluminum-fluoride trihydrate manufactured from the natural aluminum compounds mentioned above can be significantly lowered if the increased amounts of ferric ions which are present in the hot saturated aluminum fluoride solution and which are presumably in the form of various fluorine-containing complexes, are converted into the divalent form before the start of the crystallization.

Accordingly, the present invention provides a process for the preparation of crystalline aluminum fluoride trihydrate of low iron content from a saturated aqueous aluminum fluoride solution contaminated by dissolved iron compounds, by crystallization at 95° to 100° C. after adding aluminum fluoride trihydrate seeding crystals while stirring, which comprises reducing the ferric ions present in the hot aluminum fluoride solution by the addition of a reducing agent just before or during the seeding.

In principle, all reducing agents which are capable of reducing ferric ions under the conditions mentioned are suitable for the process of this invention. Hydrazine and hydroxylamine, which are appropriately added as hydrates or as salts to the acid aluminum fluoride solution the acidity being caused by hydrolysis of AlF$_3$ in aqueous solution are particularly suitable. However, sulphur-containing reducing agents such as hydrogen sulfide, sulfurous acid or thiosulfuric acid as well as rongalite have also proved to be suitable, these being added optionally in the form of the corresponding alkali metal or ammonium salts, such as sulfides, sulfites or bisulfites, to the hot acid aluminum fluoride solution whereby the free acids are liberated. These reducing agent are sulfur compounds in which the sulfur has a valency of less than 6, especially in the positive tetravalent or divalent, or negative divalent state.

The amount of reducing agent must be such that there is at least one reduction equivalent for the amount of ferric ions present in the solution. Optimum results are obtained if hydrazine is added in an excess of 1.5 to 2 reduction equivalents. Sodium sulfide and sodium bisulfite are preferably added in excesses of 3.5 to 4.5 reduction equivalents. When employing sodium thiosulfate an excess of 2 reduction equivalents suffices. Increasing these optimum amounts of reducing agent does not result in any significant improvement of the iron content in the aluminum fluoride trihydrate obtained.

The following example illustrates the process according to the invention:

5 L. of fluosilicic acid (198 g/l of H$_2$SiF$_6$) are warmed to 55° C. and mixed with 1700 g. of clay (47.5 % Al$_2$O$_3$, 1.7 % Fe). The mixture is boiled for 15 minutes and the silica is then filtered off while hot. 12.5 g. of seeding crystals are added to 500 ml. of filtrate which contains 219 g. of aluminum fluoride and 3 g. of iron per litre, at pH values around 2, and the suspension is stirred for 3 hours at 95° – 100° C. 162 g of aluminum fluoride trihydrate crystallize out and are washed with 100 ml of distilled water and dried at 95° C.

Without the reduction according to the invention a product containing 0.30 g. of iron is obtained. If however the reducing agents quoted below are added, simultaneously with the seeding crystals, in the amounts quoted below relative to ferric ions, a significant reduction of the iron content in the aluminum fluoride trihydrate which crystallizes out is achieved.

| Reducing agent | Iron content in the end product (by weight) |
|---|---|
| 18 g/l of Na$_2$S·6H$_2$O | 0.07 % Fe |
| 12 g/l of NaHSO$_3$ | 0.10 % Fe |
| 28.5 g/l of Na$_2$S$_2$O$_3$·5H$_2$O | 0.20 % Fe |
| 8 g/l of N$_2$H$_4$·H$_2$O | 0.03 % Fe |
| 2 g/l of NH$_2$OH·HCl | 0.11 % Fe |

Contamination of the end product which may have been expected through black iron sulfides separating out when using the corresponding sulfur compounds surprisingly does not occur under the reaction conditions quoted.

What we claim is:

1. A process for the preparation of crystalline aluminum fluoride trihydrate of low iron content from a saturated aqueous aluminum fluoride solution, contaminated by dissolved iron compounds which comprises adding to the aluminum fluoride solution heated to a temperature of 95° to 100° C. in an amount being an excess with respect to the amount of ferric ions present in the solution, a reducing agent selected from the group consisting of hydrazine, hydroxylamine, and the salts and hydrates thereof before or during the seeding of said solution by adding aluminum fluoride trihydrate seeding crystals while stirring, and then crystallizing the aluminum fluoride trihydrate from the hot solution.

2. A process according to claim 1, in which hydrazine is used as reducing agent, being added in an excess of 1.5 to 2 reduction equivalents for the amount of ferric ions present in the solution.

* * * * *